A. K. GRIM & J. B. LOW.
Stench-Trap.
No. 198,457. Patented Dec. 25, 1877.
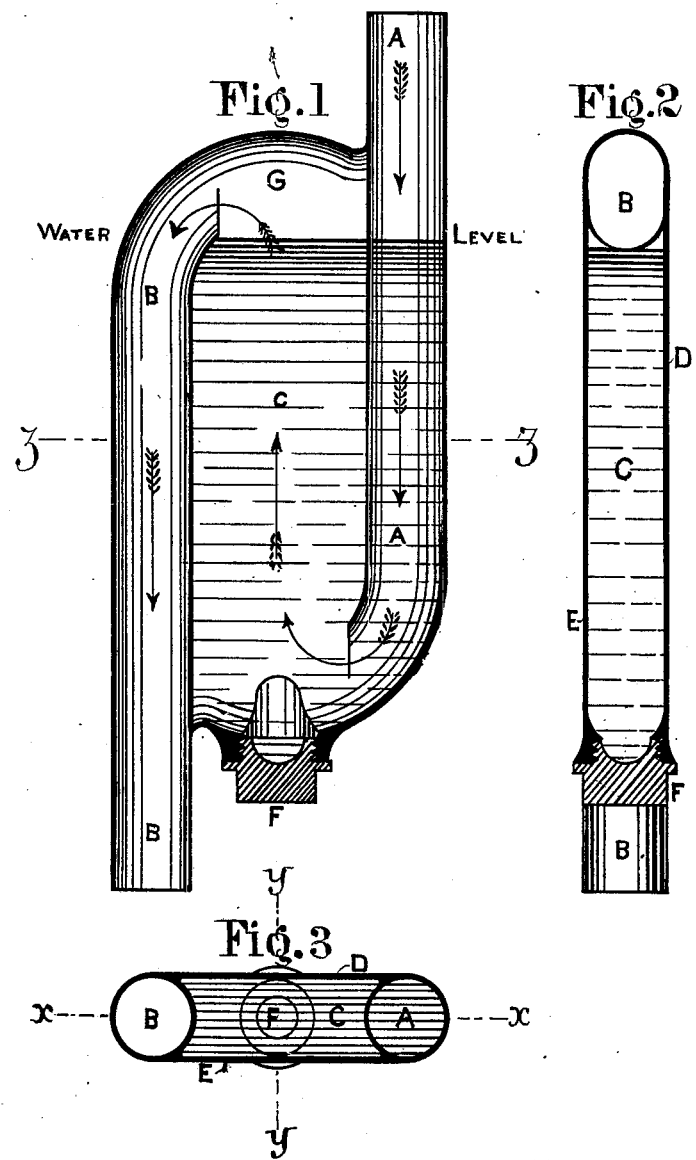
Witnesses
John Pardy
George McArthur
Inventors
Abraham K. Grim
Joel B. Low
by George Pardy
Atty

UNITED STATES PATENT OFFICE.

ABRAHAM K. GRIM AND JOEL B. LOW, OF SAN FRANCISCO, CALIFORNIA.

IMPROVEMENT IN STENCH-TRAPS.

Specification forming part of Letters Patent No. 198,457, dated December 25, 1877; application filed September 3, 1877.

*To all whom it may concern:*

Be it known that we, ABRAHAM·K. GRIM and JOEL B. LOW, both of San Francisco, State of California, have invented a new and Improved Stench-Trap applicable to drainage-pipes leading to sewers, of which the following is a specification:

The object of this invention is to overcome the defect which renders the common S-trap inoperative, inasmuch as ordinarily it acts as a siphon, and, instead of maintaining a sealing of water between the gaseous vapors rising from the sewer and the opening from said sewer which communicates with the atmosphere, as such traps are intended to do, it really permits the gaseous vapors to pass through the so-called trap, the water being drawn away from the S portion of the pipe because of this siphon principle involved in its construction.

In the accompanying drawing, Figure 1 is a sectional elevation taken through the line $x$ $x$. Fig. 2 is a cross-sectional elevation taken through the line $y$ $y$. Fig. 3 is a sectional plan taken through the line $z$ $z$.

Referring to Fig. 1, the waste water drains in the direction as shown by the arrows.

A indicates the pipe connecting with, say, the ordinary stationary wash-bowl, to which my trap may be attached. B is the pipe leading to the sewer. C is a chamber formed between and into which both pipes A and B open.

This chamber C is formed in the following manner: The pipes A and B, standing perpendicular about four inches apart, overlap each other about eight or ten inches. For from about four inches from each of their overlapping ends, half of each pipe is cut away by a cut proceeding from the direction of the opposite pipe transversely, until half the circumference of the pipe is cut through; then the cut is taken longitudinally to the end, cutting away a strip with a semicircular section about four inches long. The remaining ends of the pipes, now having a semicircular cross-section, are bent over with an easy curve to join against the exterior of the opposite pipe, in the manner clearly shown in the drawing. The chamber C is then formed complete by adding the sides D and E, Figs. 2 and 3.

The sides may be of metal or glass, as preferred; but ordinarily the trap may be cast whole, as is usually done in these cases.

A plug, F, is provided at the bottom of the chamber C, for the purpose of cleaning out any obstructions which might lodge therein.

This trap retains the advantages of the S-trap, which is least of all traps liable to become choked, the current having a direction exactly similar, as shown by the arrows. In this respect the S-trap and that herein described are similar in operation. Our trap does not, however, act as a siphon, the sealing of water never being drawn away, but remains always at the level, as shown in the drawing, because the siphon is broken, as it were, and there can never be a solid connected body of water in the pipes A and B and chamber C, an intervening air-chamber always being maintained at G, which separates the inflowing water from the water discharging down the pipe B, this air-chamber being constantly supplied with air, which bubbles up through the water-sealing from the atmosphere, when the suction in the discharge-pipe B tends to create a vacuum.

What we claim as our invention, and desire to secure by Letters Patent, is as follows:

The stench-trap consisting of the pipes A and B, overlapping each other, their ends being cut and bent over to join against the opposite pipe, while the sides D and E, joined to the said pipes longitudinally, form the chamber C, the whole as herein described, and for the purpose set forth.

ABRAHAM K. GRIM.
      JOEL B. LOW.

Witnesses:
 JOHN PARDY,
 GEORGE MCARTHUR.